United States Patent [19]

Shiina et al.

[11] 3,914,361
[45] Oct. 21, 1975

[54] METHOD FOR ROTATIONAL MOLDING OF COMPOSITE FOAMED PLASTIC ARTICLES

[75] Inventors: Naonori Shiina, Tokyo; Kirokuro Hosoda, Yokohama, both of Japan

[73] Assignee: The Furukawa Electric Co., Ltd., Tokyo, Japan

[22] Filed: June 27, 1973

[21] Appl. No.: 373,917

[30] Foreign Application Priority Data
June 29, 1972 Japan.................. 47-65183
Aug. 17, 1972 Japan.................. 47-82327
Nov. 7, 1972 Japan.................. 47-11518

[52] U.S. Cl. ............ 264/45.4; 264/45.7; 264/126; 264/310; 425/812; 425/817; 428/213; 428/218; 428/315; 428/518; 428/520
[51] Int. Cl.² .. B29C 5/04; B29C 5/12; B29D 27/00
[58] Field of Search .......... 264/51, 54, DIG. 5, 310, 264/126; 161/160, 161; 425/812, 817

[56] References Cited
UNITED STATES PATENTS

| | | |
|---|---|---|
| 1,998,897 | 4/1935 | Kay.................. 264/310 X |
| 2,736,925 | 3/1956 | Heisler et al.................. 264/310 X |
| 2,898,632 | 8/1959 | Irwin et al.................. 264/48 |
| 2,918,703 | 12/1959 | Beal.................. 264/310 X |
| 3,155,379 | 11/1964 | Fischer et al.................. 264/51 |
| 3,309,439 | 3/1967 | Nonweiler.................. 264/51 |
| 3,432,581 | 3/1969 | Rosen.................. 264/310 X |
| 3,455,483 | 7/1969 | Inklaar.................. 264/45 |
| 3,457,205 | 7/1969 | Nonweiler.................. 264/45 |
| 3,590,105 | 6/1971 | Keller.................. 264/48 |
| 3,652,760 | 3/1972 | Petri.................. 264/310 |
| 3,704,081 | 11/1972 | Immel.................. 425/812 X |
| 3,814,778 | 6/1974 | Hosoda et al.................. 264/126 X |

*Primary Examiner*—Philip Anderson
*Attorney, Agent, or Firm*—Kemon, Palmer & Estabrook

[57] ABSTRACT

A method for rotational molding of plastic articles which comprises charging powder or plastisol of thermoplastic material in an airtight mold and heating the mold with pressurized steam while rotating the mold, followed by cooling.

7 Claims, 2 Drawing Figures

METHOD FOR ROTATIONAL MOLDING OF COMPOSITE FOAMED PLASTIC ARTICLES

BACKGROUND OF THE INVENTION

This invention relates to a method for manufacturing moldings from powder or plastisol of thermoplastic material efficiently with great ease by means of rotational molding.

To date, manufacture of moldings from plastic powder in a mold has been effected by heating the mold with hot air while rotating the mold in a uniaxial or biaxial directions. Prior-art moldings have been produced by heating with hot air at normal pressure by using a mold which need not be airtight or resistant to pressure. Since such molds are inexpensive they can save plant costs. Recently, large moldings have been required for use in various applications, e.g., containers. However, the conventional nonairtight mold is limited in application. The reason is that the hot air which has an extremely low specific heat takes a long time for full heating of plastic material and application of air at high temperature to offset the low specific heat is accompanied with the following drawbacks:

1. That portion of the plastic material charged in a mold which contacts with its inner walls is heated to too high temperature and subjected to thermal deterioration. Additionally high temperatures can cause portions of the plastic material to be melted and, in consequence, gravitationally to hang from the inner walls of the mold. Therefore, the charged mass as a whole does not attach itself, in a uniform thickness, to the mold walls, presenting an uneven inner surface. This fact naturally imposes a limit on the wall thickness of an article being molded. Said wall thickness is generally limited to 7mm in practical production.

2. That portion of the plastic material charged in a mold which contacts with its inner wall is heated, as mentioned above, to a high temperature. However, some types of plastic material may thermally decompose when subjected to such heating, failing to provide a proper molding.

3. Where a mold of complicated construction is used, the mold is irregularly heated depending on the manner in which hot air flow is applied to the mold, so that an article of complicated construction may not be molded with uniform thickness.

4. Moldings having different wall thicknesses in predetermined portions can not be produced because suitable molding conditions to produce thick walls are different from those required to produce thin walls.

5. Where a plurality of molds are heated in one furnace with hot air at the same time, some molds obstruct the passage of hot air to the others, giving rise to uneven application of hot air to all the molds, with the resultant failure to form all the moldings with a uniform quality.

SUMMARY OF THE INVENTION

It is accordingly the object of this invention to provide a method for rotationally molding plastic material which is free from drawbacks accompanying the prior art process and consists in manufacturing moldings easily by rotating the mold while heating it with steam to substantially the same temperature as that at which the charged mass can be properly processed. Namely, this invention comprises charging plastic material consisting of thermoplastic powder or plastisol in an airtight mold and heating the mold with pressurized steam while rotating the mold, followed by cooling.

This invention effects the heating of plastic material charged in a mold from the outside through the mold walls with pressurized steam, permitting the utilization of the sensible and latent heat of the steam, and consequently attains the easy molding of articles at a far lower temperature more quickly than the prior art hot air process. The prior art hot air process uses 250°C to 350°C hot air in molding, for example, high density polyethylene, whereas this invention can mold the same plastic material using steam having a temperature of, for example, as low as 150°C. Therefore, this invention makes it quite unnecessary to take into account any thermal deterioration of plastic material while it is molded. Further, application of low temperature prominently reduces the fluidity of heated plastic material. That portion of the charged plastic material which contacts with the inner walls of a mold is melted with low fluidity and consequently does not gravitationally hang from the inner walls of the mold. This invention can mold articles without any limit to thickness as is the case with the prior art process, namely, it permits the molding of articles with a greater thickness than 20mm, whereas molding by the conventional process have their thickness limited to about 7mm. According to this invention, even rigid or semirigid plastic material such as polyvinyl chloride which is readily subject to thermal decomposition can be easily molded because it is not decomposed at the low temperatures usable with the new methods. Further, pressurized steam need not be forcefully ejected to the outer walls of a mold as is the case with hot air in the conventional process. This makes it possible to uniformly to heat a mold bearing even a complicated form and produce shaped articles of complicated construction having a uniform thickness. Further where many molds are collectively heated in a steam furnace according to this invention, the steam fills all space between adjacent molds producing uniform heating of all the molds and consequently the efficient production of many moldings.

DETAILED DESCRIPTION OF THE INVENTION

Figure 1:
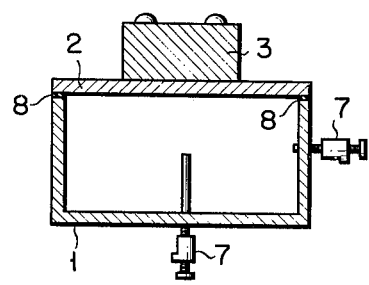
FIG. 1 is a cross-sectional view of a mold for rotational molding used in Example 3.

A method according to a first embodiment of this invention consists in heating powder or plastisol of thermoplastic material charged in an airtight mold with pressurized steam while rotating the mold, followed by cooling to provide hollow articles. As used herein, the aforesaid powder of plastic material is defined to mean a powdered or powder like form of synthetic resin. Such plastic material should have sufficiently small particle size that it can be uniformly melted by the applied heat and a particle size that will pass a standard 10 mesh screen or finer is preferred. Where powders of two or more kinds of plastic material having, for example, different sizes or different softening temperatures are molded by raising the heating temperature in several steps, there can be obtained a hollow molding having two or more layers of said different kinds of plastic material. Further, a foamed hollow molding can be produced from plastic powder containing a small amount of foaming agent. When an article is manufactured by rotating a mold containing one type of plastic powder that comprises a small amount of foaming agent mixed with another type of plastic powder having a larger particle size than the former and free from any foaming agent, then there can be produced a hollow molding having two different layers, namely, foamed outer layer and non-foamed inner layer.

A method according to a second embodiment of this invention consists in heating one type of powdered theremoplastic material mixed with larger particles of another foamable type of plastic material in an airtight mold with pressurized steam while rotating the mold, followed by cooling, thereby producing a solid molding whose core is foamed. According to this second embodiment of the invention, the plastic powder attaches itself by melting to the inner walls of the airtight mold while the mold is rotated to form a crust, and, at the same time the larger particles of the foamable plastic material expand in the molding to form a foamed core, thereby finally providing a thick article having the strong crust and foamed core. To attain the full expansion of the foamable plastic material, it is necessary to expel gas originally present in the mold prior to cooling. As the thickness increases, molding of a plastic material takes a much longer time for heating an cooling. Accordingly, the hot-air molding process practically fails to provide an article having a larger thickness than a certain extent. In contrast, the method according to the second embodiment of this invention consists in molding an article by steam heating in a mold at a temperature lower than that in hot air molding process, preventing the thermal deterioration of charged plastic material and making possible the manufacture of a solid molding even thicker than 200mm.

Where such a thick article is produced according to said second embodiment, it is advisable first to heat a mold with lower-pressure steam from the outside so as to cause fine particles of charged plastic powder free from a foaming agent to be attached by melting to the inner walls of the mold and then introduce higher-pressure steam directly into the mold to heat the larger particles of the foamable type plastic material. The direct introduction of steam into the mold prominently facilitates the thermal expansion of the foamable plastic particles, considerably reducing heating time.

The foamable plastic particles should be of larger particle size than that of the crust-forming plastic powder in order to constitute the core of a solid molding. The volume of the foamable plastic lump is generally chosen to be more than 30 times or preferably more than 100 times that of said plastic powder.

The foamable plastic particles used as one of the raw materials of a solid molding may be prepared by shaping, for example, a mixture of plastic material and foaming agent into cylindrical pellets, hollow spheres, pipes or cords. It is also possible to prepare said foamable plastic particles from hollow spheres of plastic material filled with a foaming agent. The most preferred foamable plastic particles are the type prepared by mixing polyolefins with a decomposable foaming agent and a cross-linking agent and forming said mixed mass into the above-mentioned shapes. The reason is that upon expanded, crosslinkage of said preferred particles there occurs stable growth of cells and this mitigates escape of gas evolved from the foaming agent to the outside.

Plastic materials used in the methods according to the first and second embodiments of this invention include any of polymers or copolymers of olefins, vinyl chloride or styrene, provided the raw material is of thermoplastic type. The plastic material may be prepared from a raw material already cross-linked insofar as its fluidity is not obstructed or containing a cross-linking agent. Further, the crust-forming plastic material may even be thermosetting raw material, such as phenolic resin or epoxy resin, provided the raw material is not completely thermoset so that when it is heated it can be readily melted. Where the plastic material forming the crust of a molding is polyvinyl chloride, the raw material may take a plastisol form instead of a powdered form. To the plastic material may be further added a coloring agent, flame-retardant, antioxidant or reinforcing agent as well as a foaming agent.

The foaming agents used in this invention include an organic type such as azodicarbonamide, dinitrosopentamethylene tetramine, ·P'-oxybisbenzenesulfonyl hydrazide and P-toluenesulfonyl semicarbazide; an inorganic type such as sodium bicarbonate and ammonium carbonate; and a volatile type such as petroleum ether and dichlorodifluromethane.

The cross-linking agents used in this invention include organic peroxides such as dicumyl peroxide and 2, 5-dimethyl 2, 5-di(t-butyl peroxy) hexane and azides such as 1, 10-decan bis-sulfon azide, and m-phenylene diazide. The coloring agent may consist of a pigment; the flame retardant of, for example, antimony oxide and chlorinated paraffin; the antioxidant of, for example, 2, 6-di-t-butyl hydroxytoluene; and the reinforcing agent of calcium carbonate, silicate, carbon black, glass fiber, etc.

For the method of this invention, a mold should be so rotated as to cause plastic powder to attach itself as uniformly as possible to the entire inner walls of the mold. To this end, the mold is generally rotated in biaxial directions as in the prior art rotational molding process. However, a uniaxial rotation may be adopted when a relatively large amount of plastic materials are charged in a mold or when the mold is inclined with respect to the axis of rotation. These procedures enable the plastic powder to attach itself by melting to the entire inner walls of the mold, thereby providing a molding having a uniform thickness. For the object of this invention, the mold should be rotated at such a speed as prevents a centrifugal force generated in the mold from obstructing the proper movement of the charge. Namely, the mold should be rotated at the rate at which the charge can freely slide in contact with the inner walls of the mold by the action of gravity, and ordinarily at such speed that the section of a mold which makes the quickest movement travels at the rate of less than 15 meters per minute or preferably less than 5 meters per minute.

As previously mentioned, the method of this invention is characterized by heating a mold with pressurized steam. In this case, the steam should be heated to a higher temperature than the softening point of plastic material charged. The heating temperature generally ranges between 100° and 250°C or preferably 120° and 200°C. The mold is generally heated by being surrounded with steam in a steam furnace. Alternatively the mold may be constructed with double walls and heated by introducing steam into the space between the outer and inner walls.

An airtight mold used in the method of this invention should have at the joints filled with soft metal, rubber, plastic packing or O-ring. If, therefore, a mold is provided with an open vent as in an ordinary type, then steam will directly run into the mold through said vent, failing to provide a molding with a crust of a uniform thickness. Nevertheless, where a large molding is produced as described with reference to the second embodiment of this invention, steam may sometimes be directly ejected into a mold. In such case, it is advisable first to heat the mold with steam from the outside so as to cause crust-forming plastic powder to attach itself by melting to the inner walls of the mold to form the crust of a molding and then directly eject steam into the mold to expand foamable plastic particles constituting a foamed core of the molding. In this case, the mold should preferably be fitted with a valve which is opened when pressure rises higher than the predetermined level so as to effect communication between the interior of the mold and the outside.

In the second embodiment of this invention, gas originally present in a mold should be expelled, as previously described, to attain the full expansion of foamable plastic lumps constituting the foamed core of a molding. To this end, it is advised generally to provide at least two valves for the mold with the apex of one of the valves extending to the central part of the mold and that of the other valve disposed on the inner walls of the mold. In such case, gas remaining on the inner walls of the mold is expelled by opening the latter valve and gas present at the central part of the mold is discharged by opening the former valve.

If, in the method of this invention, there is used a mold so designed as to locally receive different amounts of heat, then a molding with different thicknesses can be provided. For example, where it is desired to produce a molding whose predetermined portion has a large thickness, it is advised to reduce the thickness of that section of the mold which faces said thick portion of the molding so as to improve heat conductivity, or to fit fins or heater to said section of the mold so as to increase a heat influx thereto. Conversely, where it is desired to obtain a molding whose predetermined portion has a small thickness, it is advised to increase the thickness of that section of the mold which faces said thin portion of the molding or fit heat insulating material to said section of the mold so as to reduce the heat influx thereto.

This invention will be more fully understood by reference to the examples which follow. Throughout the examples "parts"means parts by weight.

EXAMPLE 1

An airtight hollow cylindrical mold 200mm in outer diameter, 50mm in inner diameter, and 400mm long was charged with 4kg of powder of high-density polyethylene having a melt index (hereinafter abbreviated as MI) of 3 and particle size to pass a 50 mesh pass. While rotated at the rate of 5 r.p.m. in biaxial directions, the mold was heated for 20 minutes with 160°C steam to form a hollow molding, followed by quenching. The molding obtained presented a shape exactly conforming to the inner outline of the mold, a uniform thickness of 20mm and good mechanical strength.

CONTROL 1

The same type of mold as used in Example 1 was filled with the same kind of resin. While rotated at the same rate, the mold was heated for 20 minutes with hot air at 300°C. A molding thus formed possessed an uneven thickness, especially very thin at the center of the inner skin, and had its outer surface deteriorated and discolored.

EXAMPLE 2

An airtight aluminium mold having inner dimensions of 100mm × 100mm × 100mm was charged with a mixture of 300g of powdered high-density polyethylene having MI of 1 and particle size of 25 mesh pass and 3g of azodicarbonamide. While rotated at the rate of 5 r.p.m. in biaxial directions, the mold was heated for 15 minutes with steam at a pressure of $4Kg/cm^2$ provide a foamed hollow molding. After being quenched, the product had an apparent density of 0.5 g/cc and a thickness of about 15mm, and uniform fine cells. The product which was not oxidized during heating possessed a very fine appearance.

EXAMPLE 3

There was used an airtight iron mold 1 shown in FIG. 1 5 mm in wall thickness, 50mm × 100mm × 200mm in inner dimensions and provided with two valves 7, the lid 2 being fixed to the mold 1 with a rubber packing 8 provided therebetween and having an iron block 3, 25mm × 50mm × 150mm, mounted at the central part thereof by means of set-screws. One of the two valves had the open end disposed on the inner wall of the mold and the other had the open end positioned at the center of the mold cavity. The mold was charged with a mixture of 210g of powdered high-density polyethylene having MI of 1 and particle size of 50 mesh pass, and 50g of foamable cylindrical pellets prepared by mixing 100 parts of low-density polyethylene, 10 parts of azodicarbonamide, and 1 part of dicumyl peroxide and shaping said mixture into a cylindrical form 5 mm in diameter and 8mm long. While being rotated at the rate of 10 r.p.m. in biaxial directions, the mold was heated for 10 minutes from the outside with 200°C steam in a steam furnace. Gas present in the mold was expelled by opening the valves 7. A molding obtained after quenching consisted of a crust of non-foamed material and a core of foamed material and had an apparent density of 0.32 g/cc. The outer portion of the molding facing that section of the mold which was fitted with the iron block 3 consisted of a crust about 0.1mm thick, whereas the other outer portions of the molding were formed of a crust about 3.5mm thick.

EXAMPLE 4

Figure 2:
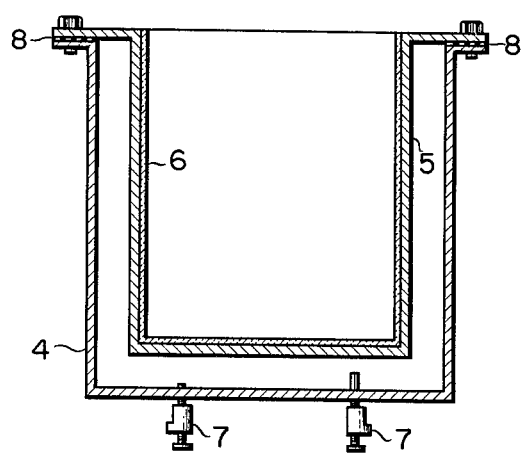
FIG. 2 is a cross-sectional view of a mold for rotational molding used in Example 4.

There was used a mold consisting, as illustrated in FIG. 2, of an outer iron wall 4 having a thickness of 10 mm and inner measurements of 500mm × 500mm × 500mm, fitted with valves 7, an inner wall 5 having a thickness of 10mm and outer measurements of 400mm × 400mm × 450mm and an asbestos board 6 having a thickness of 3mm fitted to the outer surface of said inner wall 5, the outer wall 4 and the inner wall 5 being fitted to each other with a rubber packing 8 provided therebetween. An area defined between the outer and inner walls 4 and 5 of the mold was charged with a mixture of 5 kg of powdered low-density polyethylene having MI of 3 and particle size of 100 mesh pass, and 1 10 kg of foamable cylindrical pellets prepared by mixing 100 parts of low-density polyethylene having MI of 1.0 and a density of 0.92 g/cc, 10 parts of azodicarbonamide and 0.5 part of dicumyl peroxide and shaping said mixture into a cylindrical form 4mm in diameter and 4mm long. While being rotated in biaxial directions at the rates of 5 r.p.m. and 10 r.p.m. respectively, the mold was heated for 20 minutes with 180°C steam in a steam furnace. Gas present in the mold was discharged by opening the valves 7.

A molding obtained after quenching consisted of a nonfoamed crust and a foamed core and had an apparent density of 0.2 g/cc. That portion of said crust which faced the inside of outer wall 4 of the mold was about 4mm thick, while that portion which faced the inside of the inner wall 5 was about 1mm thick, because heat transmission was obstructed by the asbestos board 6 covering the outside of the inner wall 5. A vessel thus molded had a great heat insulating property and mechanical strength. When, as described above, different amounts of heat are applied to the predetermined parts of a mold, it is possible to provide a molding in which the crusts formed in the specified portions of a molding can be made thicker or thinner than the other portions.

EXAMPLE 5

There was used an airtight cylindrical aluminium mold 50mm in diameter and 200mm long whose lid was fitted with two valves, one of which had the open end disposed on the inner wall of the mold and the other of which had the open end positioned at the center of the mold cavity.

The raw plastic material used consisted of 110g of powdered low-pressure-process polyethylene having MI of 2.0, a density of 0.96 g/cc and particle size of 100 mesh pass, mixed with 20g of foamable columnar pellets each 4mm in diameter and 4mm long prepared by extruding a composition of 100 parts of high-pressure-process polyethylene having MI of 1.0 and a density of 0.92 g/cc, 10 parts of azodicarbonamide and 0.4 part of dicumyl peroxide. The raw plastic material thus prepared was charged in the mold of the above-mentioned construction. While being uniaxially rotated about its longitudinal axis at the rate of 10 r.p.m. with the valves closed, the mold was heated for 15 minutes with 10 kg/cm² steam. When, after heating, there was opened the valve whose open end was disposed on the inner wall of the mold, gas ejected from the mold through the valve. Thereafter the valve whose open end was positioned at the center of the mold cavity was opened to vigorously expel gas out of the mold. After the valves were opened for 3 minutes, the mold was quenched for 10 minutes in a tank of water. A cylindrical molding thus obtained had a density of 0.32 g/cc, and the outer portion consisted of non-foamed crust and the core was formed of foamed cross-linked polyethylene. Therefore, the molding presented the so-called sandwich like structure and had a light weight and a prominent mechanical strength.

EXAMPLE 6

Molding was carried out under the same conditions as in Example 5 except that there was used 12g of foamable columnar pellets of plastic material. To the valve whose open end was positioned at the center of the mold cavity was connected a vacuum pump. Gas in the mold was forcefully sucked out 30 seconds by opening the valve. A molding obtained after quenching was of the same structure as in Example 5.

EXAMPLE 7

The same type of mold as used in Example 5 was fitted with valves which were closed when a higher steam pressure than pressure in the mold was applied to the outside of the mold and were opened when the stream pressure applied to the outside of the mold was lower than pressure prevailing therein. Molding was effected under the same conditions as in Example 5. After being allowed to stand 3 minutes, the mold was quenched. A molding obtained was of exactly the same structure as in Example 5.

CONTROL 2

Molding was conducted under the same conditions as in Example 5. Immediately thereafter, the mold was quenched in a tank of water with the valves closed. The molding obtained presented a noticeable deformation due to shrinkage. While the outer portion of the molding consisted of non-foamed polyethylene, the interior portion thereof was formed of insufficiently expanded mass, leaving large voids.

EXAMPLE 8

There were prepared cubic pellets measuring 5mm on each side from a foamable composition obtained by uniformly mixing 100 parts of low-density polyethylene having MI of 1.0 and a density of 0.92 g/cc, 15 parts of azodicarbonamide and 1 part of dicumyl peroxide. 5kg of the cubic pellets thus prepared was mixed with 20kg of powdered high-density polyethylene having MI of 3, a density of 0.94 g/cc and particle size of 100 mesh pass. An airtight mold having inner dimensions of 500mm × 500mm × 500mm was charged with the above-mentioned raw material. While being rotated biaxially at the rate of 3 r.p.m., the mold was heated for 15 minutes with 6 kg/cm² steam in a steam furnace. Thereafter the steam pressure was raised to 10 kg/cm² and the steam was directly introduced into the mold through the valves to heat the charge for 5 minutes. The steam pressure in the mold was reduced to normal level. A molding obtained after quenching had a density of 0.2 g/cc, a light weight and very high mechanical strength and contained no voids.

CONTROL 3

Molding was carried out under the same conditions as in Example 8, except that the mold was heated only from the outside without directly introducing steam thereinto. In the molding thus obtained, the foamable material was not fully expanded up to the center, leaving large voids in its interior.

EXAMPLE 9

The same foamable composition as used in Example 8 was extruded into a rod 6mm in diameter. The rod was coated with a layer of polypropylene having MI of 4 to provide a rod 10mm in diameter. This rod was cut up into 100mm-long pieces. 15kg of these cut rod pieces were mixed with 10kg of powdered ABS resin having a particle size of 100 mesh pass. The mixed mass was charged in an airtight mold having inner dimensions of 250mm × 500mm × 1000mm, and fitted with valves which, when steam applied from the outside of the mold reached a pressure of 10 kg/cm², were opened to introduce steam into the mold. While being rotated biaxially at the rate of 2 r.p.m., the mold was heated in a steam furnace with the steam pressure gradually increased. When the steam pressure reached a level of 12 kg/cm², heating was stopped and pressure in the mold was reduced. After being taken out of the steam furnace, the mold had its internal pressure decreased to the normal level, followed by quenching. The molding obtained consisted of a crust of ABS resin and a core of polyethylene with the polypropylene phase distributed therein, and presented prominent mechanical strength and little hydroscopicity.

EXAMPLE 10

An airtight cubic mold measuring 150mm on each side was charged with 1000g of a plastisol consisting of 100 parts of polyvinyl chloride and 75 parts of dioctyl phthalate. While being rotated biaxially at the rate of 5 r.p.m., the mold was heated for 20 minutes with steam at a pressure of 4 kg/cm² to gelatinize the paste, producing a hollow molding of soft polyvinyl chloride. Since molding was effected at a lower temperature than in the conventional process, the raw material of polyvinyl chloride did not decompose at all during heating. The molding produced was 6.5mm thick and had a smooth surface.

EXAMPLE 11

An airtight mold 25mm high, 50mm wide and 220mm long was charged with a mixture of 23g of ethylene-vinyl acetate copolymer powder (vinyl acetate content 25percent) having MI of 2.0 and softening temperature of 54°C and 69g of high-density polyethylene powder having MI of 2.0, a density of 0.96 g/cc and a melting point of 127°C. While being rotated biaxially at the rate of 5 r.p.m., the mold was first heated for 10 minutes with 100°C steam and then for 10 minutes with 150°C steam, followed by quenching. The crust of the hollow molding thus obtained consisted of an outer layer of ethylene-vinyl acetate copolymer and an inner layer of high density polyethylene, and the molding presented good mechanical properties.

What we claim is:

1. A method for rotational molding of plastic composite articles consisting of a crust and a foamed core; comprising charging a plastic material comprising a mixture of a thermoplastic powder and a thermoplastic particulate material containing a foaming agent and having a particle size at least 30 times the particle size of said powder in an airtight mold provided with a valved tube extending into the interior of the mold, rotating the mold at such a speed that every section of the mold travels a rotational speed less than 15 meters per minute, heating the mold from the outside with steam having a temperature between about 100°C and 250°C at least until said powder has melted and formed a crust upon the inner surface of the mold and said particulate material has contacted the inner surface of the crust, expanding said particulate material to form a foamed core, and cooling the mold after expelling gas present in the interior of the mold through said valved tube.

2. The method of claim 1 wherein said thermoplastic powder has a particle size less than 10 mesh screen size.

3. The method of claim 2 wherein said thermoplastic powder comprises two separate kinds of powder having different softening temperatures.

4. The method of claim 1 wherein said steam has a temperature between about 120° to 200°C.

5. The method of claim 1 wherein said particulate material has a particle size at least 100 times the particle size of said powder, said particulate material is selected from the group consisting of polymers and copolymers of olefins, vinyl chloride and styrene and said foaming agent is selected from the group consisting of azodicarbonamide; dinitrosopentamethylene tetramine; p,p'-oxybisbenzenesulfonyl hydrazide; p-toluenesulfonyl semicarbazide; sodium bicarbonate; ammonium carbonate; petroleum ether and dichlorodifluomethane.

6. The method of claim 1 wherein steam is directly introduced into said mold through said valved tube after said crust has formed upon the inner surface of the mold, then said steam introduction is stopped before said gas present in the mold is expelled through said valved tube.

7. The method of claim 1 wherein there is used a mold to produce molding with different thicknesses, said mold comprising a first section corresponding to a thick portion of the desired molding and a second section corresponding to a thin portion of the desired molding, said first section of the mold in said method being supplied with a large influx of heat and said second section being supplied with a small influx of heat.

* * * * *